UNITED STATES PATENT OFFICE.

JAMES M. A. MILLER AND PETER McMASTER, OF SAN MATEO, FLORIDA.

INSECTICIDE AND METHOD OF MAKING THE SAME.

SPECIFICATION forming part of Letters Patent No. 430,393, dated June 17, 1890.

Application filed September 23, 1889. Serial No. 324,830. (No specimens.)

*To all whom it may concern:*

Be it known that we, JAMES M. A. MILLER and PETER McMASTER, both of San Mateo, in the county of Putnam and State of Florida, have invented a new and improved Insecticide and Process of Making the Same, of which the following is a full, clear, and exact description.

This invention has for its object the reduction of sulphur to solution and holding it in solution without impairing its inherent virtues and properties as an insecticide and for other purposes. The product is mainly designed to be used as an insect and fungus destroying compound upon all kinds of fruit-trees and vines, as well as upon ornamental shrubs and flowering plants, including orange-trees, for destruction of the red spider, and for destroying the rust mite and other microscopic enemies, such sulphur solution, when properly reduced, admitting of being sprinkled or sprayed without injury on all kinds of fruit-trees, vines, shrubs, and flowering plants for the purpose above named.

The compound is made up of sulphur, caustic soda, chloride of sodium, nitrate of potassa, and water; and the invention includes the process by which sulphur is reduced from a solid to a fluid condition, substantially as hereinafter described, and pointed out in the claims.

It will be readily understood by chemists and others that caustic soda, chloride of sodium, and nitrate of potassa dissolved together in water will not reduce sulphur to a solution, but that the sulphur will settle at the bottom of the vessel containing the five ingredients—namely, sulphur, caustic soda, chloride of sodium, nitrate of potassa, and water. Such a mere mechanical combination or mixture, in which the sulphur remains in its natural condition, would be valueless as an insecticide, for instance. We accordingly do not thus prepare the mixture, but proceed as follows: Thus we take eighteen parts, by weight, of sulphur in a dry or powdered condition and pass it through a screen to remove all lumps. Then take one part of chloride of sodium and two parts of nitrate of potassa, and dissolve these two last-named ingredients in water—say in the proportion of one-half of a pint of water for every eighteen ounces of sulphur, to be afterward reduced. When the sodium and potassa are both dissolved in the water, the solution so formed is added to the sulphur and the whole thoroughly mixed until it becomes a plastic mass. This mass is then allowed to stand an hour, (more or less,) to thoroughly impregnate or charge the sulphur with the sodium and potassa. We then take sixteen parts of caustic soda and add such soda at once to the other ingredients, and stir the whole mass together until the sulphur is reduced to the consistence of cream. The vessel containing the mass is then covered, so as to exclude the air as much as possible, and the mass left undisturbed until it has cooled. When the sulphur has been treated with the solution of chloride of sodium and nitrate of potassa, as above described, and the caustic soda afterward added, both a chemical and mechanical action takes place, which converts the sulphur from a solid to a solution and at the same time neutralizes the caustic properties of the soda.

Of course the proportions of ingredients herein named may be more or less changed.

It is claimed for this solution that, being in a highly-condensed form when prepared for sale, it will prove a great economy in the cost of transportation to those who use it, and being a clear solution, free from all sediment, after being drawn off or decanted from the vessel in which it was prepared it will not clog either the pumps or spraying-nozzle when such distributing means are used, and this will make it much easier to apply than sulphur in other forms used as an insecticide.

The solution may be prepared in either large or small quantities. When prepared in small quantities—say, for instance, the reducing eighteen ounces of sulphur to solution—the method of proceeding and proportions of the other ingredients may be as hereinbefore stated, and the sulphur solution afterward be diluted for use by adding water sufficient to make one gallon of the whole. In reducing a small quantity of sulphur, however, as above, the caustic soda, prior to being introduced to the other ingredients, should be well crushed, preferably so that it will pass through a screen of not over one-fourth of an inch mesh, or a still finer crushing will produce a still more perfect result. If the reduction of the sulphur has been successful, the residue should not exceed two ounces, and the solution should indicate 14° density when tested by the hydrometer, (Baumé's scale,) supposing the tests to be made when the solution is at 92° Fahrenheit.

In treating large quantities of sulphur at a time the residue is much less and the reduction more complete than it is in small quantities.

It may here be observed that it is very difficult to reduce successfully a small quantity of sulphur, as it requires a certain degree of heat, as well as the chemical action of the caustic soda, to convert the sulphur from a solid to a solution, and unless the caustic soda is thoroughly pulverized and the mode of proceeding relative to the other ingredients closely followed out in treating so small a quantity the reduction of the sulphur will not be successful.

In preparing a small quantity of the solution it should be preferably done in an iron vessel, tin, galvanized-iron, or copper vessels not being generally suitable, and the chemical and mechanical action that takes place while the sulphur is passing from a solid to a liquid condition is liable to break a vessel of glass or earthenware.

Having thus fully described our invention, we claim as new, and desire to secure by Letters Patent—

1. The process herein described of reducing sulphur to solution and of retaining it in solution, which consists in first adding to sulphur in a pulverized condition a solution of chloride of sodium and nitrate of potassa in water and thoroughly mixing the whole, then allowing the mass to stand until the sulphur is fairly or fully charged with said sodium and said potassa, then adding caustic soda to the mixture and agitating the mass, and subsequently allowing the whole to stand and cool, as set forth.

2. The herein described insecticide, formed by the admixture of sulphur, chloride of sodium, nitrate of potassa, caustic soda, and water, as specified.

JAMES M. A. MILLER.
PETER McMASTER.

Witnesses:
R. C. GAZLAY,
A. A. MILLER.